United States Patent [19]
Brown et al.

[11] 3,968,601

[45] July 13, 1976

[54] HANDHOLE TO RECEIVE AND LOCATE CONNECTIONS OF UNDERGROUND SECONDARY ELECTRICAL POWER CABLE TERMINATIONS

[76] Inventors: Clayton S. Brown, 8021 Juanita Drive, Kirkland, Wash. 98003; Joseph Jacobs, 18221-3rd Place, SW., Seattle, Wash. 98166

[22] Filed: Dec. 19, 1974

[21] Appl. No.: 534,473

Related U.S. Application Data

[63] Continuation of Ser. No. 373,015, June 25, 1973, abandoned, which is a continuation-in-part of Ser. No. 116,346, Feb. 18, 1971, abandoned.

[52] U.S. Cl. .................................... 52/21; 52/19; 403/3
[51] Int. Cl.² ..................................... E02D 29/10
[58] Field of Search ............................ 52/19–21; 404/3

[56] References Cited
UNITED STATES PATENTS

| | | | |
|---|---|---|---|
| 319,420 | 6/1885 | Nevins .................................. | 404/3 |
| 329,343 | 10/1885 | Sutton ................................... | 404/3 |
| 714,716 | 12/1902 | Lappin .................................. | 404/3 |
| 2,862,367 | 12/1958 | Silverstein ........................... | 52/220 |
| 3,543,453 | 12/1970 | Wright .................................. | 52/20 |
| 3,562,969 | 2/1971 | Little .................................... | 52/20 |
| 3,618,275 | 11/1971 | Ance ..................................... | 52/19 |
| 3,672,103 | 6/1972 | Kost ...................................... | 52/20 |

FOREIGN PATENTS OR APPLICATIONS

| | | | |
|---|---|---|---|
| 442,214 | 3/1927 | Germany ............................. | 52/21 |
| 584,026 | 1/1947 | United Kingdom ................. | 52/21 |

*Primary Examiner*—Ernest R. Purser
*Assistant Examiner*—Henry Raduazo
*Attorney, Agent, or Firm*—Roy E. Mattern, Jr.

[57] ABSTRACT

A secondary handhole is placed in a small excavation in the ground to a depth where its cover is at ground level. It is a comparatively lightweight, portable, substantially strong and essentially unitary structure, which is shipped ready for installation at an excavation site. It provides a protective housing for secondary cable connections of underground electrical utlities and assures their prompt location by observing its ground surface level cover. The secondary handhole, in one embodiment made of fiberglass, has a three-sided rectangular body, with two sides being spaced by a reinforcing cross member extending across the bottom. There are vertical notches in the body at its open end, which extend from the top to a point just below the midline of the body to receive a removable gate extending between the two sides at an elevation higher than the location of the reinforcing cross member. The removable gate with protruding ends slides into these notches to provide a partial enclosure for this otherwise open end of the body.

Other embodiments are made of concrete, generally in rectangular form, and of plastic in a cylindrical form. The latter has an optional lockable plastic cover, a lift out gate and a vertical lower opening to receive the underground cables. Other shapes such as hexagon, octagon, may be formed, and other materials may be used.

6 Claims, 26 Drawing Figures

U.S. Patent   July 13, 1976   Sheet 1 of 3   3,968,601
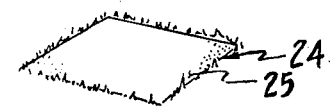
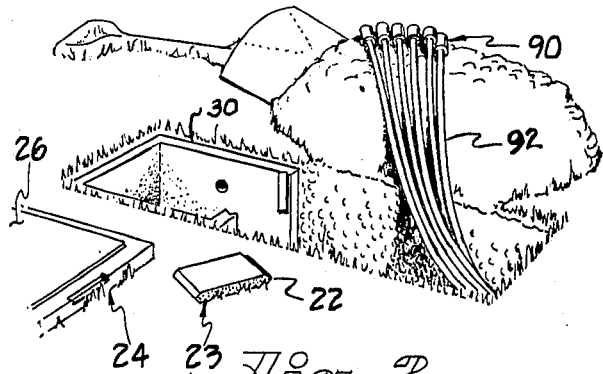
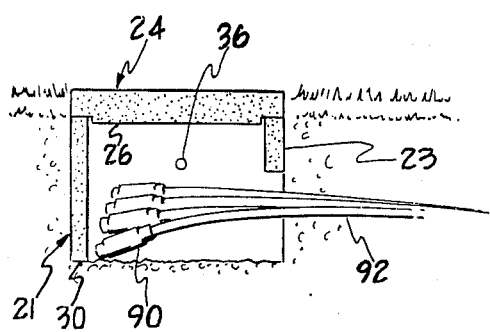
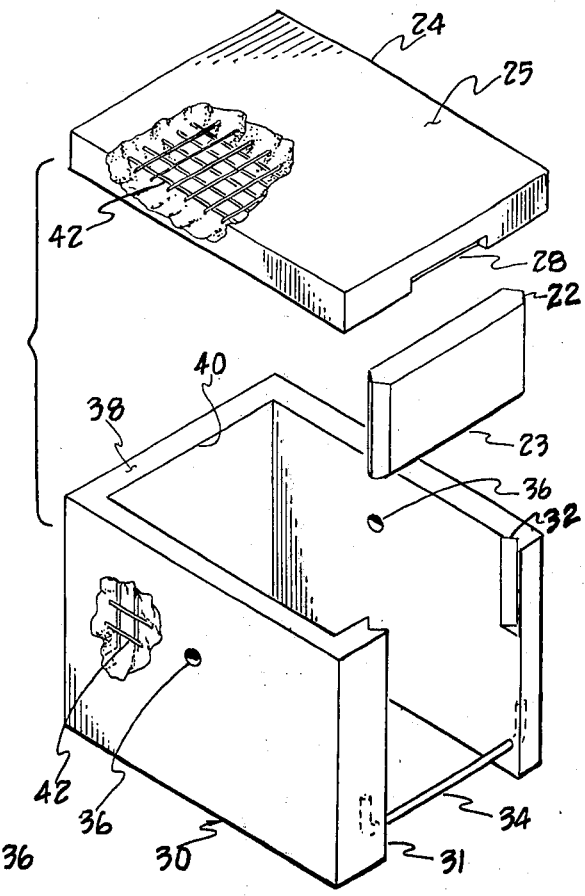
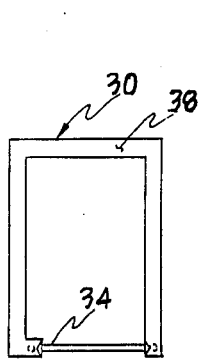
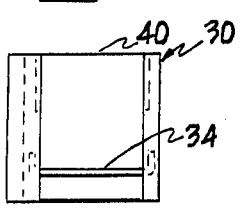

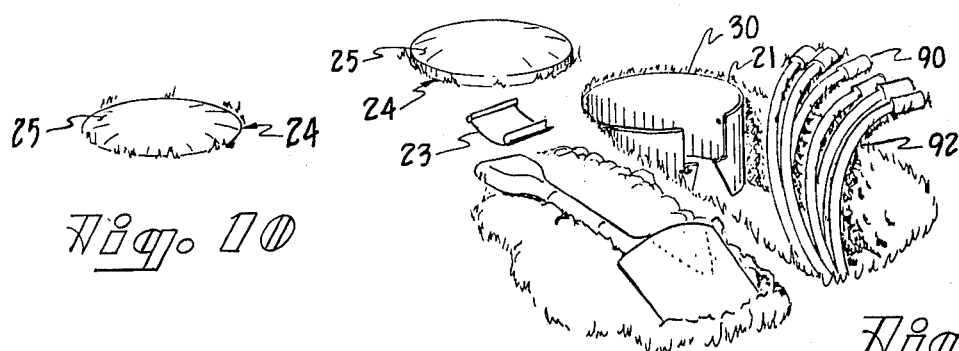
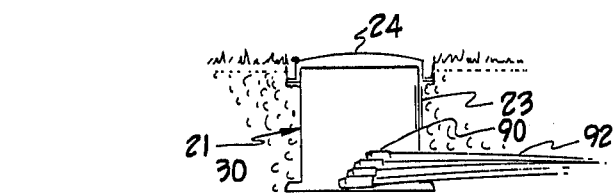
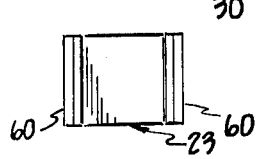
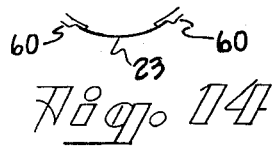
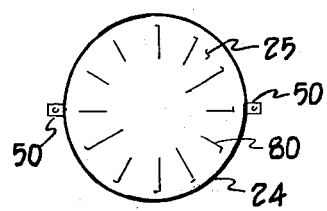
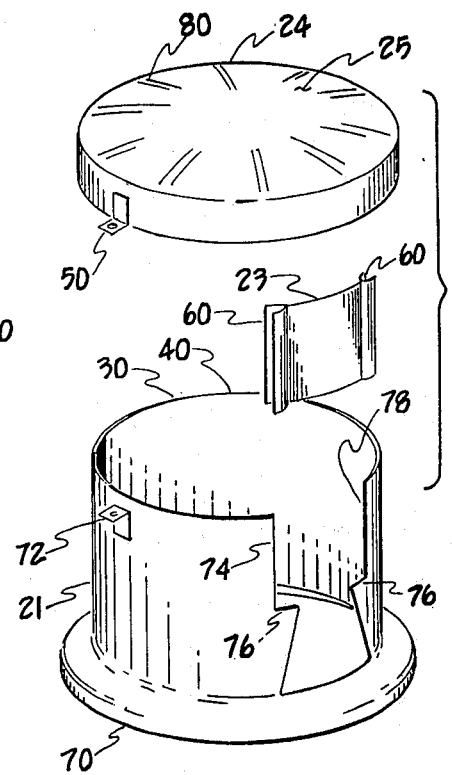
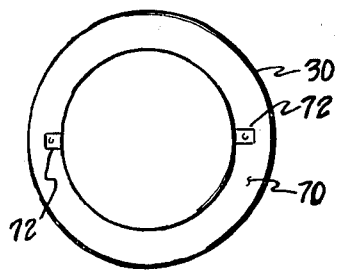
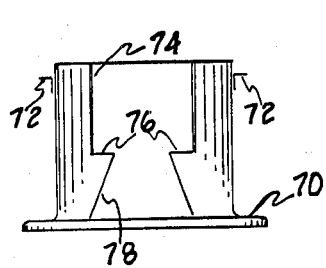
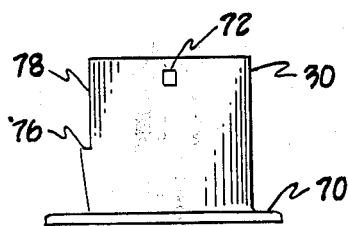

HANDHOLE TO RECEIVE AND LOCATE CONNECTIONS OF UNDERGROUND SECONDARY ELECTRICAL POWER CABLE TERMINATIONS

CROSS REFERENCE

This application is a continuation of application Ser. No. 373,015, filed June 25, 1973 now abandoned, which application is a continuation in part of the application of the same applicants, entitled "Handhole to Receive and Locate Connections of Underground Secondary Electrical Power Cable Terminations" filed on Feb. 18, 1971 (now abandoned) and having Ser. No. 116,346, and priority of this earlier filed application in reference to this application is claimed.

BACKGROUND OF THE INVENTION

Secondary cable connections placed underground by utilities and other businesses have to be readily accessible to workmen for the purposes of making additional connections as well as performing maintenance and repairs. This need has previously been filled by the use of manholes or not filled at all. Many times the complexity of connections at a certain point demands a large housing means such as a large manhole. However, in cases such as secondary cable connections which are less complicated and generally fewer in number, a simpler and smaller housing means would be highly desirable if one were available and if it would not restrict the later access to the cable connections.

Conventional larger manholes provide adequate protection and accessibility for underground wiring, but they require considerable excavation and, whether constructed at the installation site or prefabricated, they involve considerable more manufacturing and installation costs. Less complex and smaller housings have been developed in the past for water meters. However, they do not provide sufficient space for manipulating or clearance for workmen who would be performing the initial installation or any additional installations or repairs on the underground cable wiring connections. Prior to this time no housing means is known to have been made available at lower costs as a substitute housing for manholes, to receive underground cable connections and to make them as easily accessible, while always protecting them in a readily found location.

There have been precast concrete sections assembled adjacent one another to create a continuous long trench for cable and other utility installations. Their assembly at the job site requires considerably greater effort and the installation costs are high. Moreover, the assembled sections depend on backfill for support. Therefore these precast sections do not provide the convenience and economy of a substantially assembled, portable handhole housing having an integral unitary principal body structure which with its cover in place will sustain severe loading such as occurs upon overrunning by vehicles.

SUMMARY OF THE INVENTION

A secondary handhole serves to replace the need for a conventional manhole by providing a small housing for secondary cable connections of underground wiring. A small hole is dug, often by using a hand shovel, of sufficient size to accommodate the body of the small secondary handhole and the near end of entering underground cable runs. When properly dug it will allow the top edges of the uncovered body portion of the handhole to be approximately two inches below the surface of the final ground level. Secondary cable connections then are lowered down into the body of the handhole utilizing the open end of the body for access and a passageway. A gate is then positioned across the open end of the body, leaving below it a small passage beneath the gate through which the cables pass. Then the cover is placed in position and earth is backfilled and packed around the secondary handhole. The only visible portion is the cover top with identifying indicia, naming for example the utility company supplying electrical power, and its surface is flush with the ground. Thus with only a small amount of initial or subsequent digging, the cables are laid or are later reached to any degree necessary to implement additional installations or to make repairs, as necessary, the cables being raised to a good working height.

The secondary handhole is fabricated from reinforced concrete, from strong plastic materials, or from other materials that are durable when placed underground. Its shape is not limited, however rectangular and round shapes are generally used. When concrete is used, the weight of the concrete cover, in one embodiment being approximately 95 pounds, is sufficient to prevent small children from tampering with the handhole and its protected cable connections. When plastics are used, the cover is connected to the body of the handhole by metal hasps securely inserted in respective portions in the plastic cover and body and the respective portions are secured with a tamperproof lock, preferably of the type requiring that it must be sheared off, rather than unlocked to provide access to the interior of the handhole and the cable connections. If the body of the handhole is made from fiberglass, it may be made strong enough to be fitted with a concrete cover. Alternatively, a plastic or fiberglass cover secured with a lock could be used. Also fiberglass cover could be used as a concrete form to create a concrete-fiberglass cover, the concrete being optionally poured at the installation site.

When repairs, changes, maintenance, further inspection, additions, etc. are required, then only a limited excavation or small earth removal is undertaken for a short distance over the buried underground cables adjacent to the handhole. Thereafter, cables in part or all together are lifted clear of the handhole, after removal of its cover and often also a gate is lifted clear when it is preferably used. The connection cable ends are lifted preferably to a work bench height and cleaned. Thereafter the electrical work is undertaken conveniently and kept clear of the dirt and debris often found bothersome when such work is done at ground level, below ground level and/or in manholes. After the connections are again completed, the cable ends with their connections are lowered through the combined open top and side entry of the handhole, the gate, if preferably used is installed, the cover is installed, and back filling is undertaken adjacent to the Applicants' handhole, leaving the top of the cover of the handhole at or near ground level for its quick observation.

The handhole, in any of its configurations, is sufficiently strong and integral enough to be shipped substantially in assembled form, often being nested to save shipping space. Moreover all are quickly and conveniently installed. Also in some of the plastic or fiberglass embodiments even though they are light and portable, when once covered with a concrete cover, they are of sufficient strength to withstand the weight distributed by an overrunning vehicle.

DRAWINGS OF PREFERRED EMBODIMENTS

Three preferred embodiments of the comparitively small secondary handholes are illustrated in the accompanying drawings. FIGS. 1 through 9 show an all concrete secondary handhole, FIGS. 10 through 20 depict an all plastic secondary handhole, and FIGS. 21 through 26 show a light weight fiberglass handhole having a concrete cover. More particularly:

FIG. 1 is a perspective view of the all concrete handhole cover at ground level with the concrete handhole body fully positioned and buried beneath it;

FIG. 2 is a perspective view of the handhole, opened and disassembled, showing the secondary cable connections and nearby portions of the cables either just prior to their insertion into the body of the handhole or their removal therefrom;

FIG. 3 is a cross-sectional view of the handhole fully assembled and positioned, containing the secondary cable connections;

FIG. 4 is a top view of the handhole gate illustrating its V-shaped protruding edges;

FIG. 5 is a side view of the handhole gate that is located perpendicular to the long axis of the handhole;

FIG. 6 is a top view of the body of the handhole showing the reinforcing cross bar;

FIG. 7 is an end view of the body of the handhole at the open end showing the position of the reinforcing cross bar;

FIG. 8 is a side view of the body of the handhole;

FIG. 9 is an exploded perspective view of the secondary handhole with portions removed from some parts to show the interior welded wire fabric reinforcements;

FIG. 10 is a perspective view of the all plastic round handhole cover located at ground level with a plastic handhole body positioned below it;

FIG. 11 is a perspective view of the plastic round handhole opened and disassembled showing the secondary cable connections and nearby portions of the cables at a removed place where they are serviced;

FIG. 12 is a cross-sectional view of the plastic handhole fully assembled and positioned, containing the secondary cable connections;

FIG. 13 is an exterior side view of the gate used with the circular plastic handhole;

FIG. 14 is a top view of the gate for a circular, plastic handhole, illustrating its curved shape and receiving channel ends;

FIG. 15 is a top view of the cover of a plastic circular secondary handhole;

FIG. 16 is a side view of the cover of a plastic, circular secondary handhole;

FIG. 17 is an exploded perspective view of a plastic, circular secondary handhole;

FIG. 18 is a top view of the body of a plastic circular secondary handhole;

FIG. 19 is an end view of the body of a plastic, circular secondary handhole indicating the opening for the cable connections and cable;

FIG. 20 is a side view of the body of a plastic, circular secondary handhole showing the side of the end opening;

DESCRIPTION OF PREFERRED EMBODIMENTS

Figure 21:
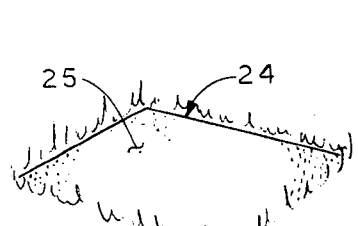
FIG. 21 is a perspective view of a concrete, rectangular handhole cover located at ground level with a fiberglass handhole body positioned below it.

All of the embodiments of the comparatively small handhole illustrated in the accompanying drawings and described are directed toward providing an economical replacement for the large conventional manholes when they are not deemed economically essential to protect and to locate underground cable connections. A reduction in costs results: from the simplicity of the secondary handhole 21 itself; from the decreased need for any extensive excavation; from the decrease in time required for installation, and subsequently, in the decrease in time in locating the handhole and in making repairs undertaken at a convenient level.

The secondary handhole 21 made entirely of concrete, as shown in FIGS. 1 through 9, is utilized by first digging a hole of sufficient width and depth to accommodate body 30 of the handhole 21 locating its upper surface 38 approximately two inches below ground level. Lifting holes 36 one formed in each side are used during the positioning of the heavy concrete body 30 which weighs approximately two hundred pounds.

The structural strength of body 30 of handhole 21 gained by using reinforced concrete 42, wherein the principal reinforcement is No. 44-6 gage welded wire fabric. Also, a ¾ inches diameter steel tie bar 34 is imbedded at each of its ends and bridges the open end 31 of handhole 21.

Once body 30 of handhole 21 is in position, and while the secondary handhole 21 remains un-assembled, cable connections 90 are lowered down inside, passing through open end 31 of body 30. Then gate 23 is placed into position inserting its V-shaped, protruding ends 22 into V-shaped notches 32 which face each other at open end 31 of body 30 of handhole 21.

The use of gate 23 is unique. When removed it allows complete removal of cable connections 90 and cables 92 with only limited excavating adjacent handhole 21. After gate 23 is positioned, the cover 24 is put into place. Its underside protruding portion 26 fits the inner surface edges 40 of body 30 of handhole 21, thereby preventing horizontal movement of the cover 24. As a result, the cover 24 is only removed by lifting it up vertically. Inset grooves 28 are located at two opposite cover ends to provide a hand grip for persons lifting cover 24. In one embodiment the thickness of the reinforced concrete cover 24 is approximately two inches. Backfill is placed around the secondary handhole 30 up to ground level. The upper surface 25 of concrete cover 24 is flush with the ground level and it is formed or marked with indicia identifying the utility.

The illustrations of FIGS. 10 through 20 pertain to an embodiment preferably made entirely of plastic materials and having a circular shape. This embodiment has the same functional features that are offered by the all concrete embodiment. The different unique features of the plastic embodiment are numbered distinctively. However, parts having like functional features in each embodiment are numbered the same, whether made of reinforced concrete or plastic, such as the cover 24.

The body of the secondary handhole 30 in its concrete embodiment had no flange base 70. However, in lieu of a tie bar 34, the plastic embodiment of body 30 of the secondary handhole 21 is provided with a flange base 70. Additional stability is acquired and any direct pull up is hindered by flange base 70, until an intentional excavation is undertaken. Youngsters will not be able to lift the secondary handhole 21 out of the ground.

The weight of the cover 24 in the concrete embodiment acts to reasonably secure the secondary handhole 21 against unwanted intrusion. However, this weight advantage is absent in the plastic embodiment. Therefore, plastic cover 24 has a pair of stainless steel hasp portions 50 molded into its plastic. They are paired with two matching hasp portions 72 that are molded into the plastic of body 30 of handhole 21. These hasp portions 50 and 72 after installation of the underground cable connections are held together by an expendable low cost tamper proof lock, (not shown), which opens preferably only by the forceful shearing of portions of the lock.

The plastic gate 23 is provided with receiving channel ends 60. These receiving channel ends 60 slide over edges 74 of the opening 78 in the plastic body 30. The downward progress of plastic gate 20 during its installation is halted by abutments 76 formed at the opening 78 in secondary handhole 21. Throughout the plastic handhole 21, integral rib reinforcements are used such as the radial ribs 80 in the cover 24.

Figure 24:
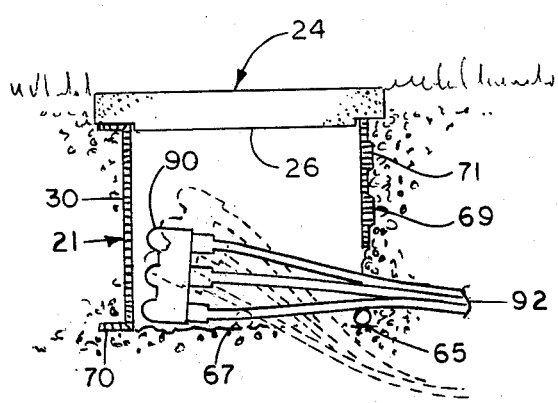
FIG. 24 is a cross-sectional view of the handhole fully assembled and positioned, containing the secondary cable connections and illustrating the optional locations of the removable reinforcing and spacing cross member of the body.
Figure 25:
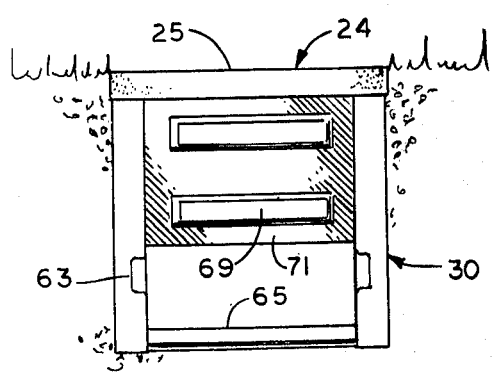
FIG. 25 is an end view of the body of the handhole at the open end, showing the removable gate in the closed position.

FIGS. 21 through 26 illustrate a third embodiment having a concrete cover or concrete filled cover and a body made of a combination of resinous plastic and fiberous cloth known as fiberglass. This type of secondary handhole utilizes a removable reinforcing cross member 65 which is relocated at optional locations 67 by positioning its ends in easily drilled holes 73 when the sides of the handhole body 30 are flexed further apart slightly from their normal parallel alignment. FIG. 24 illustrates the relocation of the cross member to a new position 67 to accommodate and clear cables 92 entering the handhole 21 from a greater depth underground.

The fiberglass body 30 of the handhole 21 is formed with integral, offset, reinforcing ribs 63 which add strength to the handhole body 30 and may be used as a hand grip for lowering or lifting the handhole. Similar integral offset structure 69 is formed in the fiberglass door 71 for reinforcement and as a hand grip for raising and lowering it.

Figure 22:
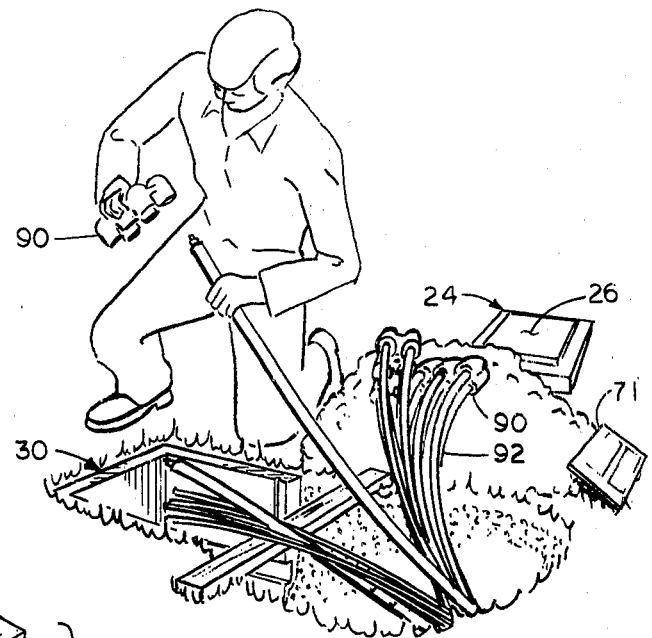
FIG. 22 is a perspective view of the fiberglass, rectangular handhole opened and disassembled, showing the secondary cable connections and nearby portions of the cables, as they have been lifted to a higher level where they are being worked on by a man in a more comfortable position.
Figure 23:
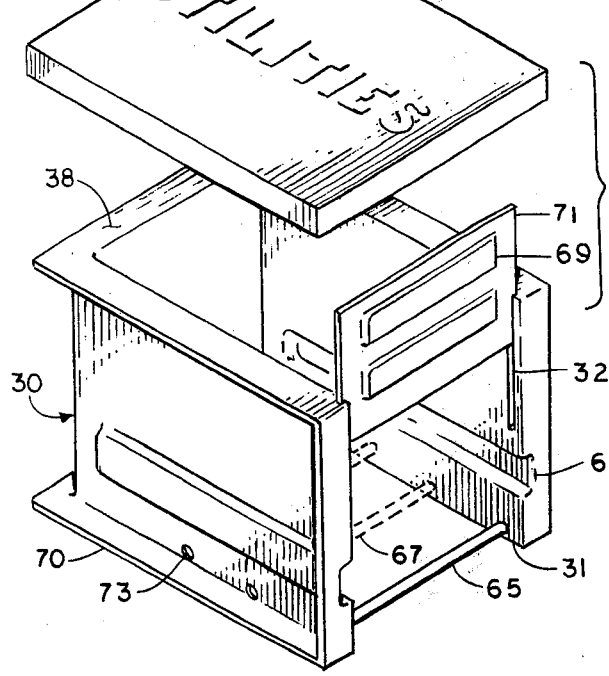
FIG. 23 is an exploded perspective view of the secondary handhole, showing the optional locations of the removable cross member used for reinforcement and spacing of the body and some positional control of the cable terminations.
Figure 26:
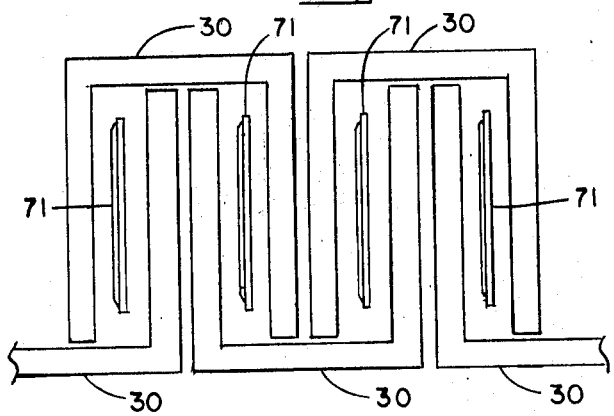
FIG. 26 is a top view of several handhole bodies and gates, illustrating the manner in which they may be nested during shipment and storage for convenience and to save shipping and storage costs, the removable cross member being removed to accommodate this nesting.

The light, unitary bodys 30 of the handhole and gates 71 may be nested for compactness, as illustrated in FIG. 26, during shipment or storage. Also FIG. 22 illustrates the comfortable height working position and accessibility of cable interconnections after a slight amount of excavation adjacent to the handhole 30 and their lifting. They may also be raised further to bench height.

SUMMARY OF ADVANTAGES

In each illustrated embodiment, a comparatively small secondary handhole of a size sufficient to hold portions of underground cables and their connections is provided at ground level and below to help to identify their location and provide easy inspection access. If repairs and/or changes are deemed necessary only limited excavation is needed over a short distance of the cables adjacent to the secondary handhole. Then with the cover and gate removed, the cable connections and cable may be lifted out and above to a convenient working level free of obstructions providing full access to them. Moreover, these secondary handholes may be shipped in nested arrangements and be substantially ready for installation because of their strong and near unitary structure. They are quickly installed by digging a comparatively small hole at the termination or near the termination of underground cables where they are to be joined together, and thereafter be ready for instant inspection and convenient modification and/or repair.

We claim:
1. Secondary handhole means, adapted to be installed in the ground with its top adjacent ground level, for receiving terminal portions of underground secondary wiring cables and their connectors, comprising:
   a. a one-piece integral unitary upstanding substantially surrounding body structure comprising vertical wall means for defining said structure;
   b. means defining a completely open horizontal top entry on said body structure and a single complementary vertical entry through said vertical wall means, joining said horizontal top entry, for forming a complete lay in lift out underground secondary cable entry, receiving the terminal portions of underground secondary wiring cables and their connectors which may come in at different elevations and all from the same general direction whereby such cables and connectors may be easily lifted by their ends from said secondary handhole means to a convenient standup working height for alterations, additions or repairs, and readily lowered and replaced in said secondary handhole means after such alterations, additions or repairs;
   c. means defining a completely transverse horizontal clear lower entry at the bottom of said body structure joining said vertical entry, for receiving underground secondary cables which may come into said secondary handhole means from therebeneath, said lower entry, vertical entry and top entry forming an open slot completely vertically through said secondary handhole means whereby such underground secondary cables which may come into said secondary handhole means from therebeneath may be easily lifted by their ends from said secondary handhole means to a convenient standup working height for alterations, additions or repairs, and readily lowered and replaced in said secondary handhole means after such alterations, additions or repairs;

d. opposed lower portions of said vertical wall means further comprising means defining a plurality of pairs of opposed hole means therein and a removable, relocatable, reinforcing member selectively insertable into a complementary pair of said hole means whereby said reinforcing member is selectively optionally relocatable further from said vertical entry to clear and support entering cable terminations at varying angles of entry from respective underground depths;

e. A removable gate placed substantially across a top portion of said vertical entry, the top of the gate being located flush against such horizontal top entry, the bottom of the gate being located well above the plane of said lower entry, said gate thus providing a strong structural cross member for said body structure and a clear opening therebeneath for underground secondary cables positioned therethrough; and f. a removable cover placed over said body structure, completely covering said horizontal top entry.

2. Secondary handhole means, as claimed in claim 1, wherein the vertical ends of said vertical wall means adjacent said vertical entry further comprise means defining a pair of complementary recesses for removably slideably mounting said gate therein, each of said recesses having a height corresponding to the height of said gate, whereby said gate may be positioned therein with its top flush against said horizontal top entry.

3. Secondary handhole means, as claimed in claim 1, wherein the cover has depending structure formed, on its underside, to interfit with the interior top portions of the substantially surrounding and fully upstanding body.

4. A secondary handhole as claimed in claim 1, wherein the substantially surrounding and fully upstanding body has a flange base for stability and to receive earth loads preventing its removal without prior excavation.

5. Secondary handhole means, as claimed in claim 1, wherein locking means are provided to secure the cover to the horizontal top entry of the substantially surrounding and fully upstanding body, thereby preventing unauthorized entry to the connectors of the terminal ends of underground wiring cables.

6. Secondary handhold means, adapted to be installed in the ground with its top adjacent ground level, for receiving terminal portions of underground secondary wiring cables and their connectors, comprising:

a. a one-piece integral unitary upstanding substantially surrounding body structure comprising vertical wall means for defining said structure;

b. means defining a completely open horizontal top entry on said body structure and a single complementary vertical entry through said vertical wall means, joining said horizontal top entry, for forming a complete lay in lift out underground secondary cable entry, receiving the terminal portions of underground secondary wiring cables and their connectors which may come in at different elevations and all from the same general direction whereby such cables and connectors may be easily lifted by their ends from said secondary handhole means to a convenient standup working height for alterations, additions or repairs, and readily lowered and replaced in said secondary handhole means after such alterations, additions or repairs;

c. means defining a completely transverse horizontal clear lower entry at the bottom of said body structure joining said vertical entry, for receiving underground secondary cables which may come into said secondary handhole means from therebeneath, said lower entry, vertical entry and top entry forming a open slot completely vertically through said secondary handhole means whereby such underground secondary cables which may come into said secondary handhole means from therebeneath may be easily lifted by their ends from said secondary handhole means to a convenient standup working height for alterations, additions to repairs, and readily lowered and replaced in said secondary handhole means after such alterations, additions or repairs;

d. opposed lower portions of said vertical wall means further comprising means defining at least a pair of opposed hole means therein and a removable reinforcing member insertable into said pair of said hole means;

e. a removable gate placed substantially across a top portion of said vertical entry, the top of the gate being located flush against such horizontal top entry, the bottom of the gate being located well above the plane of said lower entry, said gate thus providing a strong structural cross member for said body structure and a clear opening therebeneath for underground secondary cables positioned therethrough; and f. a removable cover placed over said body structure, completely covering said horizontal top entry.

* * * * *